June 30, 1953  A. B. JACOBSEN  2,644,093
FREQUENCY STABILIZING CIRCUIT
Filed Jan. 24, 1945
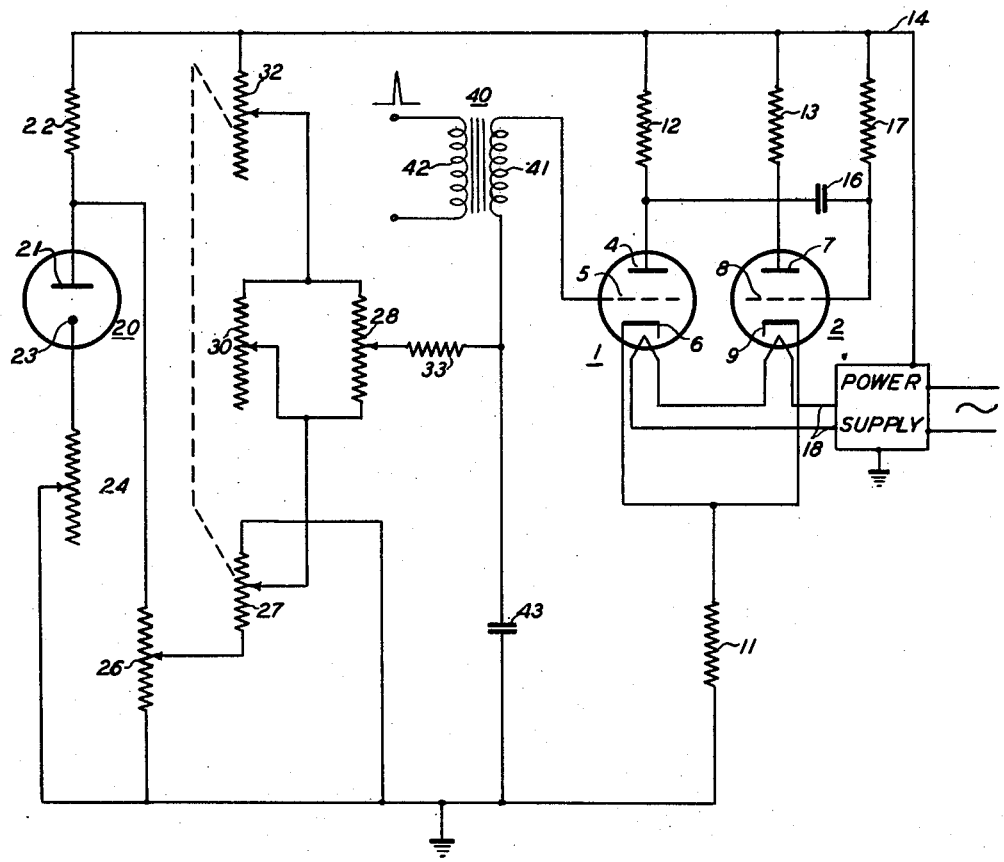
INVENTOR.
ANDREW B. JACOBSEN
BY
William D. Hall
Attorney Patented June 30, 1953

2,644,093

UNITED STATES PATENT OFFICE 2,644,093

FREQUENCY STABILIZING CIRCUIT

Andrew B. Jacobsen, Cambridge, Mass., assignor, by mesne assignments, to the United States of America as represented by the Secretary of War Application January 24, 1945, Serial No. 574,373

4 Claims. (Cl. 250—36)

This invention relates to electrical apparatus and more particularly to means for maintaining uniformity of operation of a multivibrator under conditions of fluctuating power supply.

The precision delay multivibrator described herein is adapted for range measurement in radio-echo detection equipment. In such use the proper width of the pulses must be uniformly maintained to obtain accuracy in range measurement. To achieve this result it has been necessary heretofore to operate this type of multivibrator from a carefully regulated power supply.

It is an object of this invention to provide means for adjusting the grid bias of one of the multivibrator tubes to compensate for changes in plate and cathode-heater voltage so that operation will be uniform. Another object is to eliminate the necessity for the use of a regulated voltage supply.

The figure shows a diagram of a multivibrator circuit using the principles of this invention.

Referring now to the drawing, there are shown two triodes, 1 and 2, provided with plates 4 and 7, grids 5 and 8, and cathodes 6 and 9, respectively. Cathodes 6 and 9 are connected through a common cathode resistor 11 to ground. Plates 4 and 7 are connected through resistors 12 and 13, respectively, to a conductor 14 which leads from a source of positive potential at the power supply. Plate 4 of tube 1 is connected through a condenser 16 to the grid 8 of tube 2, which grid is connected through a large resistor 17 to the aforesaid source of positive potential. Cathodes 6 and 9 are supplied with heater current through wires 18 from the power supply.

One electrode 21 of a neon glow tube 20 is connected through a resistor 22 to the conductor 14 leading to the source of positive potential. Electrode 21 is also connected through a potentiometer 26 to ground. The other electrode 23 of glow tube 20 is connected through a rheostat 24 to ground. The sliding contactor of potentiometer 26 is connected through a potentiometer 27 to ground. The sliding contactor of potentiometer 27 is connected through a potentiometer 28 and a rheostat 30, connected in parallel, and then through a rheostat 32 and the wire 14 to the source of positive potential. The sliding contactor of potentiometer 28 is connected through a resistor 33 and the secondary 41 of a transformer 40 to the grid of multivibrator tube 1. Condenser 43 is connected between ground and the junction of resistor 33 and secondary 41. Potentiometer 27 and rheostat 32 are arranged for ganged operation.

In operation, the triode 2 is normally conducting, its grid 8 being held at approximately the cathode potential by the grid current through the large resistor 17. The current through the common cathode resistance 11 is sufficient to make the cathode 6 of tube 1 positive with respect to the grid, and this tube is therefore nonconducting. In this condition the current and voltage in the circuit are independent of the grid voltage of tube 2. The condenser 16 is charged to a voltage equal to the potential difference between the plate 4 of tube 1 and the grid 8 of tube 2 because of the small grid current drawn by tube 2 through the resistor 17.

A positive trigger pulse is applied to the primary 42 of transformer 40 and through the secondary 41 to grid 5 of tube 1. Tube 1 thereby becomes conducting, causing its plate voltage to drop. Through the medium of condenser 16 this drop in voltage affects the grid 8 of tube 2 so that the grid potential is driven below the new cathode potential. The cathode potential of tubes 1 and 2 falls immediately after occurrence of the trigger pulse to a value which is determined by the bias applied to grid 5 of tube 1. Under the conditions now prevailing in the circuit, tube 1 is conducting and tube 2 is nonconducting.

Following the above-described changes in the distribution of voltages throughout the multivibrator circuit there is a change in the charge potential of the condenser 16. In consequence thereof the grid potential of tube 2 rises to the point at which the tube begins to conduct. As current starts to flow in tube 2 the cathode potential rises to cut off tube 1, thus increasing the voltage at plate 4 which in turn raises the grid potential of tube 2 (through the condenser 16) thereby increasing the current in tube 2 and the multivibrator returns to the normal quiescent condition. The change occurs very rapidly and in a regenerating fashion.

Any variation in the alternating current supply will cause a corresponding variation in the voltage of the positive potential source and also a change in the cathode heater current. These changes, if not compensated for, produce a variation of pulse widths corresponding to an error in range when the multivibrator is used as part of the apparatus for measuring range in radio-echo equipment.

In the circuit herein described the voltage across the electrodes of neon glow tube 20 tends to remain constant and any increase or decrease in potential will be divided between resistor 22 and rheostat 24 in direct proportion to the resistance values of these elements. This causes the potential of electrode 21 to increase and decrease directly with increases and decreases of potential at the positive voltage source and by an amount depending on the ratio of the values of resistances 22 and 24.

The potential of electrode 21 is applied to potentiometer 26, and through its connections with the potentiometers and rheostats designated 27, 30, 28, and 32, controls the bias of grid 5 so that the grid bias is changed an amount just sufficient to compensate for changes in plate voltage and cathode heater voltage. The proper width of pulse is thus maintained throughout fluctuations in applied voltage.

Potentiometer 27 and rheostats 30 and 32 comprise a calibrating network which cooperates with range potentiometer 28 in range setting operations. Range potentiometer 28 is varied in normal operation to vary the widths of the pulses produced by the multivibrator. Rheostat 30, which may be preset, determines the interval between the upper and lower limits of pulse widths obtainable by adjustment of potentiometer 28. Potentiometer 27 and rheostat 32, which may also be preset, enable adjustment of the minimum pulse widths obtainable by means of potentiometer 28 without materially affecting the interval between the upper and lower limits of pulse widths.

What I claim to have invented is:

1. In combination, a multivibrator circuit operated by fluctuating voltage source and including an electronic discharge device having a control grid, said voltage source including upper and lower potentials, a glow tube connected in series between two resistors, said glow tube and said resistors being connected between said upper and lower potentials, said glow tube having at least two electrodes, a first potentiometer connected between one electrode of said glow tube and the one of said potentials most remote from said one electrode, said first potentiometer having an adjustable center tap connected through a second potentiometer to said one potential, said second potentiometer having an adjustable center tap connected through a third potentiometer and a first rheostat connected in parallel and a second rheostat connected in series to said other potential, said third potentiometer having an adjustable center tap connected to said control grid, and means coupled to said control means to cause said multivibrator to be triggered.

2. In combination, a multivibrator circuit operated by fluctuating voltage source and including an electronic discharge device having a control grid, said voltage source including upper and lower potentials, a device having two terminals across which the voltage tends to remain constant, said device being connected in series between two resistors, said device and said resistors being connected between said upper and lower potentials, a first potentiometer connected between one electrode of said device and the one of said potentials most remote from said one electrode, said first potentiometer having an adjustable center tap connected through a second potentiometer to said one potential, said second potentiometer having an adjustable center tap connected through a third potentiometer and a first rheostat connected in parallel and a second rheostat connected in series to said other potential, said third potentiometer having an adjustable center tap connected to said control grid, and means coupled to said control means to cause said multivibrator to be triggered.

3. In combination with a multivibrator having an electronic discharge device including a control grid and supplied with a fluctuating voltage source, said multivibrator being arranged to produce pulses of adjustable widths, first means including a glow tube to adjust the potential applied to said control grid to compensate for fluctuations of said voltage source, said first means including means for varying the widths of the pulses produced by said multivibrator, said first means also including means for determining the interval between the upper and lower limits of said pulse widths, said first means also including means for adjusting the minimum pulse widths obtainable without materially affecting the interval between upper and lower limits of pulse widths.

4. An oscillatory electrical circuit including an electron discharge device having a control grid, a fluctuating voltage source, a potentiometer and a first rheostat connected in parallel, said parallel potentiometer and first rheostat being connected in series with and between a second rheostat and a third rheostat, the network consisting of said potentiometer and said first, second and third rheostats being connected across said voltage source, said potentiometer including an adjustable center tap connected to said control grid, and means coupled to said control grid to supply a triggering pulse to said circuit.

ANDREW B. JACOBSEN.

References Cited in the file of this patent

UNITED STATES PATENTS

| Number | Name | Date |
|---|---|---|
| 1,541,311 | Anderson | June 9, 1925 |
| 1,642,526 | Wright | Sept. 13, 1927 |
| 2,318,644 | Tubbs | May 11, 1934 |
| 2,213,855 | Black | Sept. 3, 1940 |
| 2,262,838 | Deloraine et al. | Nov. 18, 1941 |
| 2,437,892 | Rambo | Mar. 16, 1942 |
| 2,281,644 | Schock | Apr. 28, 1942 |
| 2,282,895 | Shepard | May 12, 1942 |
| 2,284,101 | Robins | May 26, 1942 |
| 2,320,876 | Mabry | June 1, 1943 |
| 2,377,500 | Johnson | June 5, 1945 |
| 2,392,416 | Sorensen | Jan. 8, 1946 |
| 2,397,337 | Clough | Mar. 26, 1946 |
| 2,398,916 | Brewer | Apr. 23, 1946 |